United States Patent Office

3,799,738
Patented Mar. 26, 1974

3,799,738
FLAME RETARDANT PROCESS FOR CELLULOSICS
George M. Wagner, Lewiston, N.Y., assignor to Hooker Chemical Corporation, Niagara Falls, N.Y.
No Drawing. Filed Feb. 17, 1972, Ser. No. 227,294
Int. Cl. D06m 13/28, 13/44
U.S. Cl. 8—181
10 Claims

ABSTRACT OF THE DISCLOSURE

An improved process for imparting flame retardance to cellulose-containing materials has been devised whereby materials which have been impregnated with a solution having a pH from about 7 to about 9 and a monomeric tris(hydroxymethyl) phosphine content of about 10 to about 40 percent by weight, dried to a moisture content of about 10 to about 20 percent and the monomer polymerized on and in the material by treatment with ammonia, are treated first with gaseous ammonia for about one to less than about five minutes and thereafter with an aqueous solution of ammonia for at least ten but not more than sixty seconds. The monomer is more rapidly polymerized on and in the material by the combined action of gaseous and aqueous ammonia than with gaseous ammonia alone, which results in a more effective and more economical process readily adaptable to high speed commercial textile machinery.

FIELD OF INVENTION

This invention relates to an improved process for rendering cellulose-containing materials flame retardant. More particularly, it relates to a more rapid and hence more practical process for polymerizing monomeric tris(hydroxymethyl) phosphine on and in cellulose-containing materials with ammonia to render them durably flame retardant.

BACKGROUND OF THE INVENTION

In U.S. Pat. 3,607,356, it has been proposed to impregnate cellulose-containing materials with an aqueous solution containing an equilibrium mixture of tris(hydroxymethyl) phosphine ("THP") and tetrakis(hydroxymethyl) phosphonium hydroxide ("THPOH"), said solution having a pH of about 7 to about 8. In this process, the impregnated material containing from 10 to about 40 percent by weight of the monomer is dried to about 10 to about 20 percent moisture and then treated with gaseous ammonia to polymerize the monomer. The gaseous ammonia step requires from two to six minutes exposure time depending upon the character, i.e., the weight, fibrous nature, etc., of the treated material. In many textile processes, the materials are processed in equipment operating at high speed in a continuous manner. Accordingly, operations involving processing times of several minutes duration require either static operation or units of such size wherein such relatively long residence times can be obtained. It is, therefore, desired to process such materials in equipment wherein shorter residence times consistent with high speed continuous operations can be obtained in a practical manner. It can thus be seen that the process disclosed in U.S. Pat. 3,607,356 is practical for only the lighter, open weave, materials and leaves something to be desired when processing heavier and/or close knit materials.

It is known, also, as disclosed in U.S. Pat. 2,983,623, to cure a further polymerizable methylol-phosphorus polymeric material containing at least one free methylol group attached to a phosphorus atom incorporated in a cellulosic material, by exposing said material in the dry state to the action of gaseous ammonia followed by subjecting it to an aqueous ammonia treatment. In this process, the further polymerizable resins disclosed are solutions of reaction products of tetrakis(hydroxymethyl) phosphonium chloride and urea which solutions are relatively strongly acid and are applied in the presence of buffers which adjust the pH of the solutions to a pH within the range of about 3.5 to 4. The impregnated materials are thoroughly dried and then exposed to ammonia gas for about 5 to 10 or more minutes and then immersed in aqueous ammonia for about 10 or more minutes to complete the cure of the resin on and in the material. Such a process also requires relatively long time cycles of treatment especially in the aqueous ammonia bath and hence is hardly applicable with modern high speed processing techniques.

The process of the present invention differs from these and other less pertinent prior art procedures in providing a more rapid, effective, and practical ammonia curing step and is applicable with currently used high speed textile processing equipment.

OBJECTS OF THE INVENTION

It is, therefore, a principal object of the present invention to provide an improved process for treating cellulose-containing materials to render them durably flame retardant.

Another object is to provide a more rapid process for imparting flame retardant characteristics to cellulose-containing materials whereby said materials are impregnated with a solution of monomeric tris(hydroxymethyl) phosphine and rapidly cured by the combined action of gaseous ammonia followed by aqueous ammonia.

A particular object is to provide a process which does not require, in the curing step, prolonged exposure of the impregnated material to either gaseous ammonia or aqueous ammonia or both.

These and other objects will be apparent to those skilled in the art by the following description of the present invention.

SUMMARY OF THE INVENTION

It has now been found that cellulose-containing materials can be rapidly and economically rendered durably flame retardant by a process which comprises:

(a) Impregnating a cellulose-containing material with a solution of tetrakis(hydroxymethyl) phosphonium hydroxide having a pH of from about 7 to about 9, and containing from about 10 to about 40 percent by weight of monomeric tris(hydroxymethyl) phosphine.

(b) Partially drying the impregnated material, preferably under relatively mild conditions, to a moisture content of from about 10 to about 20 percent by weight.

(c) Exposing the partially dried material to gaseous ammonia for a period of at least about one minute but less than about 5 minutes, and (d) Treating the thus exposed material with an aqueous solution of ammonia for a period of from about 10 to not more than about 60 seconds thereby to cure the phosphorus containing resin in and on the material and render it durably flame retardant.

The ammonia treated material may be washed and dried numerous times without substantial loss of fire retardancy.

DETAILED DESCRIPTION OF THE INVENTION

In accordance with a preferred mode of carrying out the improved process of this invention, an aqueous solution of tetrakis(hydroxymethyl) phosphonium hydroxide containing from about 10 to about 40 percent by weight of monomeric tris(hydroxymethyl) phosphine and having a pH of from about 7 to about 9 is prepared and used to impregnate a cellulose-containing material, and after drying the impregnated material to about 10 to about 20 percent moisture exposing said material first to gaseous ammonia for at least about one to less than about five minutes and preferably for about one to about two minutes and, thereafter, treating said exposed material with an aqueous solution of ammonia for a period of from about 10 to not more than about 60 seconds and preferably for about 15 to about 30 seconds. The thus treated material containing an insoluble polymer of the phosphonium compound in and on the material is washed and dried.

The cellulosic materials which can be treated to impart flame retardant properties thereto in accordance with this invention include cotton, rayon, paper, jute, ramie, wood and mixtures thereof, as well as blends of cellulosics, such as cotton or rayon with synthetic materials, such as nylon, polyesters, acrylics, and the like. The process of this invention is particularly effective when applied to the treatment of cellulosic-containing materials such as cotton and rayon.

The solution used to impregnate the cellulosic-containing material is an aqueous solution containing tris(hydroxymethyl) phosphine and tetrakis(hydroxymethyl) phosphonium hydroxide as an equilibrium mixture. Such a solution is well known in this art and can be prepared by several known methods. Preferably these solutions are prepared by reacting a solution of tetrakis(hydroxymethyl) phosphonium chloride with an approximately equimolar quantity of an organic or inorganic base, preferably sodium hydroxide. The pH of the final solution is adjusted to from 7 to 9 and preferably to from 7.5 to 8.1. For the purpose of this invention, the active component of the aqueous solution is considered to be monomeric tris(hydroxymethyl) phosphine. Hereinafter, the active component will be expressed in terms of this component, although it is probable that there is present a mixture of tris(hydroxymethyl) phosphine and tetrakis(hydroxymethyl) phosphonium hydroxide.

The aqueous treating solution may be applied to the cellulosic material in any convenient manner. For example, the solution may be applied by padding, dipping, spraying, and the like. After impregnation, the excess solution is preferably removed from the material by passing the material through squeeze rolls, centrifuging, wringing, or other methods. Although a wet pick-up of from about 50 to about 200 percent may suitably be used, preferably the material contains about an equal weight, i.e., about 100 percent pick-up, of the treating solution.

The impregnated material is then dried to a residual moisture content of about 10 to about 20 percent. The drying is carried out in air or in drying oven at temperatures which may vary from ambient to about 100 degrees centigrade. Excessive drying temperatures are to be avoided. The drying time may vary according to the drying temperature and also the weight and fibrous nature of the material, as will be obvious to those skilled in this art. The moisture content of the material may be measured by a conventional moisture meter.

The partially dried cellulose-containing material is treated with gaseous ammonia by exposure in a conventional closed chamber to effect a partial polymerization i.e. not substantially in excess of about 85 percent, and preferably from about 50 to about 85 percent of the monomeric phosphorus compound. Treatment times with gaseous ammonia to obtain this partial polymerization may vary from about one minute but should not exceed about five minutes. The extent of polymerization accomplished in this step will vary according to the amount resin add-on in the material as well as the nature of the material itself, the longer times being used for higher resin add-on and vice versa. However, as has been found, complete polymerization and curing of the resin with gaseous ammonia requires an extended period of exposure over that required to obtain the indicated degree of partial polymerization according to the present process, and results in an inefficient utilization of the ammonia gas, at least about 100 to 200 percent excess ammonia being required. Furthermore, the polymerization reaction being exothermic, prolonged exposure at this stage may result in tendering of and other deleterious effects on the material.

The material, after exposure to gaseous ammonia is then treated with an aqueous solution of ammonia. This treatment serves to complete the polymerization of the resin in and on the material and also to cool the material thereby preventing tendering of the fabric. This step should be carried out as rapidly as possible, it being necessary only to thoroughly wet the material with the aqueous ammonia. The material is preferably immersed in the solution of aqueous ammonia and is immediately removed from the bath and run into a scouring or washing bath. The treatment with aqueous ammonia can be carried out by padding, dipping, spraying and the like. The time required for this treatment varies from about 10 to not more than about sixty seconds, and preferably from about 15 to 30 seconds.

Preferably, the aqueous solution of ammonia is a dilute solution containing about two to about five percent $NH_3$. The solution may be ammonium hydroxide, a buffered ammonium salt solution, or solution of ammonium carbonate and the like.

Following the polymerization and/or curing operation, the treated material is preferably scoured or washed to remove unpolymerized materials and the like. Where the present invention is carried out on yard goods using mill apparatus, this scouring operation may be effected using any of the conventional scouring processes such as rope scouring, open width scouring, jig scouring and the like. The scouring may be conveniently carried out using, e.g., an aqueous soak solution containing small amounts of sodium carbonate, perborate or peroxide, and synthetic detergents. Preferably this scouring is carried out immediately after the chemical curing step i.e., the treatment with ammonia gas and aqueous ammonia. Preferably, the scouring step is followed by a conventional drying operation and thereafter the dried treated material may be subjected to any normal finishing operating such as sanforizing, calendering, and the like.

The flame retardant cellulose-containing materials treated in accordance with the procedures set forth above have been found to be durably flame retardant, even after numerous launderings. Additionally, such materials have a tear resistance, tensile strength, and hand which are substantially unchanged from those of untreated materials.

The process of this invention is readily adaptable to modern high speed commercial textile processing equipment. Substantial savings of time and of consumption of ammonia gas, in the range of about 100 to 200 percent, are effected by this improved process.

The following examples will illustrate the process of the present invention. In these examples, as well as in the above specification and the claims hereinafter set out, parts and percentages are by weight and temperatures are given in degrees Fahrenheit, unless otherwise specified. Flame retardancies reported were determined in accordance with the procedure of the American Association of Textile Chemists and Colorists, Test AATCC Base 34-1952.

EXAMPLES 1-5

An aqueous solution containing 40 percent tris(hydroxymethyl) phosphine and having a pH of 7.4 was used to impregnate a 4 oz./yd.$^2$ cotton lawn fabric, a relatively heavy, close knit fabric. The impregnated material was passed through squeeze rolls to give a wet pick-up of about 100 percent and then it was dried to about 20 percent moisture retention in a 220° oven for 25 seconds. Equal size swatches of the fabric were exposed to gaseous ammonia in an enclosed cabinet for various times, as indicated in the following table, and then an aqueous ammonia bath containing 3 percent $NH_3$. In each instance, a similar impregnated and partially dried swatch of the material was, for comparison purposes, treated with gaseous ammonia but not aqueous ammonia and passed directly into the aqueous scouring bath. The swatches, which had been treated with aqueous ammonia, were immediately removed from the aqueous ammonia bath, passed through squeeze rolls, and then into an aqueous scouring bath. The residence time in the aqueous ammonia bath was about 15 seconds. Following the scouring, the fabric was rinsed in cold water and dried. The resin add-in of the dried scoured material was determined and the flame retardant character of the treated fabric was evaluated after the dried material was boiled for nine hours in a solution containing 90 parts soap, 90 parts soda ash, 10 parts of a synthetic anion detergent in about 50,000 parts of water.

TABLE

|  | Ex. 1 | | Ex. 2 | | Ex. 3 | | Ex. 4 | | Ex. 5 | |
| --- | --- | --- | --- | --- | --- | --- | --- | --- | --- | --- |
|  | A | B | C | D | E | F | G | H | I | J |
| Residence time in NH$_3$ gas (minutes) | 0.5 | 0.5 | 1.0 | 1.0 | 2.0 | 2.0 | 5.0 | 5.0 | 10.0 | 10.0 |
| Aqueous ammonia treatment [1] | No | Yes | No | Yes | No | Yes | No | Yes | No | Yes |
| Percent resin add-on after scour [2] | 7.3 | 16.0 | 17.8 | 22.2 | 19.7 | 23.2 | 26.6 | 25.6 | 27.4 | 27.4 |
| Char length (inches) after 9-hour boil | B | B | B | 3.5 | B | 3.4 | 3.3 | 3.7 | 2.9 | 3.6 |

| [1] Composition of aqueous ammonia bath was: | Parts |
| --- | --- |
| Water | 800 |
| Ammonia sulfate | 50 |
| Sodium bicarbonate | 50 |
| Sodium carbonate | 30 |

| [2] Composition of aqueous scouring bath: | Percent |
| --- | --- |
| Sodium silicate | 1.0 |
| Hydrogen peroxide (35%) | 5.0 |

LEGEND.—B indicates sample burned.

As indicated in the above table, five sets of two fabric swatches each were exposed to gaseous ammonia and one swatch of each pair also treated with aqueous ammonia. Each experiment provides a comparison of the prior art process with that of the instant invention. These results indicate that under the conditions of these tests, the material required about five minutes exposure (or more than two minutes) to gaseous ammonia alone to impart thereto fire retardant character. It is shown also, that a fabric swatch exposed to ammonia gas for one minute and then treated with aqueous ammonia was rendered fire retardant. Thus the treatment given sample D of experiment 2 was equivalent to the treatment given sample G of Example 4. Note that even a two-minute gaseous ammonia treatment (sample E of Example 3) was ineffective. However, with the gaseous ammonia treatment of five or more minutes, substantially no difference in fire retardance was shown between the prior art treatment and the treatment according to the present invention. These results demonstrate that substantially less exposure period to gaseous ammonia is required, when accompanied by treatment with aqueous ammonia, to provide flame retardancy than when the aqueous ammonia treatment is omitted.

The present invention has been described in the above specification and examples with reference to several specific embodiments. Such reference has been made for purely illustrative purposes and various modifications in the details included therein can be made without departing from the scope or spirit of the invention, as will be obvious to those skilled in this art.

What is claimed is:

1. A process for preparing flame retardant cellulose-containing materials which comprises:
   (1) impregnating a cellulose-containing material with an aqueous solution having a pH of from about 7 to about 9 and containing from about 10 to about 40 percent by weight of monomeric tris(hydroxymethyl) phosphine;
   (2) drying the thus impregnated material to about 10 to about 20 percent moisture retention;
   (3) treating the partially dried material with gaseous ammonia for a period of about one to less than about five minutes to effect a partial polymerization not substantially in excess of about 85 percent of the monomeric phosphorus compound; and
   (4) treating the thus treated material with an aqueous solution of ammonia for a period of about 10 to not more than 60 seconds to complete the polymerization of the phosphine compound in and on the cellulose-containing material.

2. The process of claim 1 wherein the partially dried material is treated with gaseous ammonia for a period of about two minutes.

3. The process of claim 2 wherein the material is treated with aqueous ammonia for about 10 to about 15 seconds.

4. The process of claim 1 wherein the material after treatment with gaseous ammonia is treated with aqueous ammonia for about 15 to about 30 seconds.

5. The process of claim 4 wherein the material after treatment with aqueous ammonia is scoured with an aqueous alkaline soap solution containing a peroxide immediately after removal from the aqueous ammonia solution.

6. The process of claim 1 wherein the cellulose-containing material is a cotton fabric.

7. The process of claim 1 wherein the pH of the impregnating solution is about 7.5 to 8.1.

8. The process of claim 7 wherein the impregnating solution contains about 40 percent of the monomeric tris (hydroxymethyl) phosphine compound.

9. In a process for imparting flame retardance to a cellulose-containing material which comprises impregnating the material with a solution having a pH of about 7 to about 9 and a monomeric tris(hydroxymethyl) phosphine content of about 10 to about 40 percent, drying the thus impregnated material to a moisture content of from about 10 to about 20 percent, and polymerizing the tris(hydroxymethyl) phosphine resin on and in the material with ammonia, the improvement which comprises partially polymerizing not substantially in excess of about 85 percent the monomeric phosphorus compound by treating the impregnated material with ammonia gas for about one to less than about five minutes and thereafter completing the polymerization of said monomeric phosphorus compound by treating the material with an aqueous ammonia solution for at least about 10 but not more than sixty seconds.

10. The process of claim 9 wherein from about 50 to about 85 percent of the monomeric phosphorus compound is polymerized by the treatment with gaseous ammonia.

References Cited

UNITED STATES PATENTS

| | | | |
|---|---|---|---|
| 3,607,356 | 9/1971 | Beninate et al. | 117—62.2 |
| 3,276,897 | 10/1966 | Reeves et al. | 117—136 |
| 2,983,623 | 5/1961 | Coates | 117—62.2 |
| 2,772,188 | 11/1956 | Reeves et al. | 117—136 |
| 3,404,022 | 10/1968 | Chance et al. | 117—136 X |

OTHER REFERENCES

Flame Retardant Gets Plant-Scale Trial, article in Chemical and Engineering News, Sept. 9, 1968, pp. 42 and 43.

HERBERT B. GUYNN, Primary Examiner

U.S. Cl. X.R.

8—116 P; 17—62.2, 136